United States Patent [19]

Bachenko

[11] Patent Number: 5,157,759
[45] Date of Patent: Oct. 20, 1992

[54] WRITTEN LANGUAGE PARSER SYSTEM

[75] Inventor: Joan C. Bachenko, Hoboken, N.J.

[73] Assignee: AT&T Bell Laboratories, Murray Hill, N.J.

[21] Appl. No.: 546,127

[22] Filed: Jun. 28, 1990

[51] Int. Cl.$^5$ ............................................. G10L 9/00
[52] U.S. Cl. ........................................ 395/2; 381/51
[58] Field of Search .................... 381/44, 51–53; 395/2; 364/419

[56] References Cited

U.S. PATENT DOCUMENTS

| | | | |
|---|---|---|---|
| 3,704,345 | 11/1972 | Coker et al. | 381/52 |
| 4,278,838 | 7/1981 | Antonov | 381/52 |
| 4,674,065 | 6/1987 | Lange et al. | 364/419 |
| 4,831,654 | 5/1989 | Dick | 381/52 |
| 4,868,750 | 9/1989 | Kucera et al. | 364/419 |
| 4,872,202 | 10/1989 | Fette | 381/52 |
| 4,873,634 | 10/1989 | Frisch et al. | 364/419 |
| 4,975,957 | 12/1990 | Ichikawa et al. | 381/52 |
| 4,996,707 | 2/1991 | O'Malley et al. | 381/52 |
| 5,060,154 | 10/1991 | Duncan, IV | 364/419 |

OTHER PUBLICATIONS

J. P. Olive and M. Y. Liberman in "Olive-Liberman Synthesizer", 1985, Text-to-speech-An Overview, Journal of the Acoustic Society of America, Supplement I 78, S6.

*Primary Examiner*—Michael R. Fleming
*Assistant Examiner*—David D. Knepper
*Attorney, Agent, or Firm*—H. T. Brendzel

[57] ABSTRACT

An enhanced text-to-speech synthesizer accepts freely generated text sequences of words and synthesizes the received sequences with proper emphasis and with properly placed pauses. In combination with other elements, the synthesizer provides for an enhanced Dual Party Relay Service where the text generated by the sound-impaired party is synthesized without an attendant's intervention. The text generated by users is made more intelligible by interpreting abbreviations, correcting errors (misspellings and "noise"), translating special terms that are used by the community of users, de-emphasizing words based on syntactic considerations and inserting pauses to enhance intelligibility.

27 Claims, 2 Drawing Sheets

WRITTEN LANGUAGE PARSER SYSTEM

BACKGROUND OF THE INVENTION

This invention relates to speech synthesis of freely generated text and, more particularly, to synthesis of freely generated text created by sound-impaired (hearing-impaired or speech-impaired) persons.

Dual Party Relay Service is a service that allows sound-impaired individuals to communicate with individuals who are not so impaired. By dialing a specified number, such individuals are interconnected to an attendant that connects the calling party to the called party and relays the established conversation.

More specifically, incoming calls from sound-impaired users are placed through a digital device, such as a Telecommunications Device for the Deaf (TDD) or a computer terminal and a modem. The sound-impaired user enters text through the TDD (or the like) and the text is received and displayed to the attendant. Through a separate connection, the attendant speaks the displayed text words to the unimpaired party, listens to the spoken response of the unimpaired party and transmits a written text message to the sound-impaired party which corresponds to the spoken response heard by the attendant. The sound-impaired party receives the written text message on a display device.

The above-described procedure suffers from lack of privacy. It is also very slow, cumbersome, and highly labor intensive. It would be highly beneficial to both the users and the telephone company to eliminate or at least reduce the attendant's involvement in calls to and from sound-impaired parties.

The potential clearly exists for eliminating the need for an attendant's assistance at least in the direction where text is converted to speech. One example is the "telephone information" service of AT&T and the Bell Operating Companies. In response to an inquiry, the telephone information operator accesses a data base, identifies the desired number and activates a synthesizer. However, this and all of the known other text-to-speech synthesizers systems deal exclusively with "canned" speech, which is speech (or text) with a predefined syntax and vocabulary.

In principle, it should be possible to enter the text generated by a TDD user into a speech synthesizer and have the synthesizer generate the spoken words which could be transmitted to a person who is not sound-impaired. In practice, this is not easy to do. Speech synthesizers convert text to speech exactly as the text appears. This requires the text to be correct, error free, properly punctuated and in standard syntax. Written language of the deaf, however, exhibits many departures from expected patterns of English syntax (or other languages, for that matter). The following three sentences are examples of written language of the deaf (WLD) texts that were produced by different writers:

*They tend refusing to communicate.*
*Some people have strong based on knowledges.*
*I have many appointment from my childrens.*

In a study of WLD, V. R. Charrow in *Deaf English* Technical Report 236, Institute for Mathematical Studies in the Social Sciences, Stanford University, 1974, asserts that the variability of WLD is systematic and rule-governed. She writes:

I suggest that the deaf are constructing a different *variety* of English, based on an internalization of certain rules of English, but not others, and affected, in some cases, by interference from ASL, whose rules are radically different from those of English. The result is the hypothesized 'Deaf English'.

An examination of WLD syntax supports Charrow's claim. Although syntactic variation in WL texts appears random, a closer look shows that the variation is consistent. WLD exhibits a collection of non-standard features that can be identified and described. Some anecdotal evidence for this conclusion comes from the fact that standard English speakers usually adapt to the style after reading a number of WLD texts; serious comprehension problems seem to arise only when sentences are extremely telegraphic, word order is exceptionally free, or lexical choices are obscure.

In short, what is needed for the Dual Party Relay Service is the ability to accept and synthesize freely generated text; and the consistency of WLD suggests that computational analysis of this language style might be a feasible goal.

SUMMARY OF THE INVENTION

Motivated by the need to enhance the Dual Party Relay Service, this invention provides for text to speech synthesis of freely generated text. More particularly, this invention offers a text-to-speech synthesizer that accepts a freely generated text sequence of words and synthesizes the sequence with proper emphasis and with properly placed pauses. In combination with other elements, this invention provides for an enhanced Dual Party Relay Service where the text generated by the sound-impaired party is synthesized without the attendant's intervention. The synthesis can take place at the sound-impaired person's premises, at the local telephone central office, or at some designated regional location.

In combination with still additional elements, this invention provides for a completely automatic two-way communication with sound-impaired parties by including a speech-to-text converter.

In accordance with the principles of this invention, text that is generated by a sound-impaired user is made more intelligible by interpreting abbreviations, correcting errors (misspellings and "noise"), translating special terms that are commonly used by sound-impaired persons, translating non-standard word sequences or phrases, and in general, converting the text messages to more standard English. In addition, pauses are inserted to enhance intelligibility.

In one preferred embodiment of this invention, text is inserted into a processor which analyzes a selected number of words at a time. Based on predefined rules, signals are applied to a conventional synthesizer to develop the speech signal.

DETAILED DESCRIPTION

Figure 1:
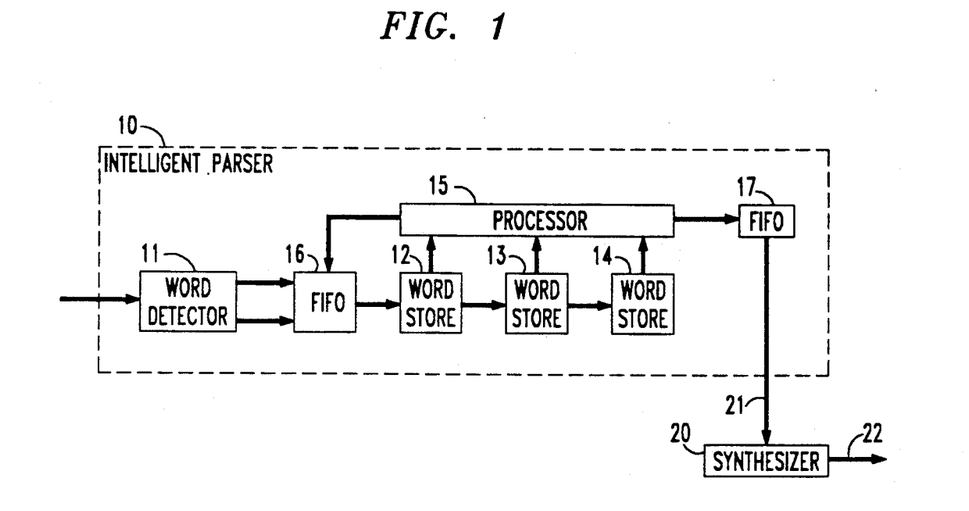
FIG. 1 depicts a block diagram of a text to speech sound conversion system.

FIG. 1 illustrates, in block diagram form, one embodiment for the freely generated text-to-speech synthesizer of this invention. Block 10 is an intelligent parser, and block 20 is a synthesizer. Synthesizer 20 is a conventional synthesizer such as the "Olive-Liberman Synthesizer", J. P. Olive and M. Y. Liberman, 1985, Text-to-speech—An Overview, *Journal of the Acoustic Society of America*, Supplement 1 78, S6. Its input, on line 21, is text that is at times annotated with special instructions. Its output, on line 22, is the analog speech signal.

Intelligent synthesizer 10 comprises word detector 11, "word store" blocks 12, 13 and 14 and rule based processor 15. Text is entered into term detector 11 where words, or terms, are identified. Typically, a blank space, a punctuation mark, or the end of a line denotes the end of a term. The punctuation marks are terms in and of themselves. Detected terms are inserted into the serial interconnection of "word store" 12, "word store" 13 and "word store" 14 in a shift register fashion. Although FIG. 1 depicts the use of three "word store"s (12, 13 and 14), it should be appreciated that any number of such stores may be used. The terms stored in each one of the "word store"s is received by rule-based processor 15.

The function of processor 15 is to analyze the terms applied thereto, to modify the applied terms, to incorporate emphasis and pauses in syntactically proper places, and to apply the modified terms to synthesizer 20 at the appropriate times.

The rules executed within processor 15 can be divided into two classes: the rules that identify and alter terms and the rules that recognize relevant syntactic information.

The rules that identify and alter terms take care of recognizing abbreviations, recognizing special terms that are used by the relevant community of users, recognizing word phrases containing a number of words equal to the number of "word stores" (in FIG. 1, that number is 3) and recognizing misspellings, typographical errors and other "noise" entries. A common "noise" entry, for example, is "XXXXX", which typically denotes deletion of letters (in this case, 5 letters).

In addition to the above word modifications, the rules that identify and alter terms also perform a disambiguation function to make the text more accurate and more intelligible. That includes adding words (e.g. prepositions) to make the text have a more standard English syntax.

After the rules that identify and alter terms are applied, the syntactic rules are applied. These rules apply local syntactic constraints to determine whether a pause should come before or after any word in the "word stores".

In connection with pauses, the issue of input timing and processing timing must be addressed. Timing of spoken speech is quite important to intelligibility or, more accurately, the *relative* timing of groups of words is critical. However, information about timing is not available in the text supplied by a TDD, and the arrival times of text words bear no relationship whatsoever to the proper timing of the spoken speech. Additionally, the processing times within processor 15 are not known *a priori*, so the timing of the output signals of processor 15 does not track the timing of the input signals. Furthermore, one can have the situation where closely timed incoming text requires so much processing time that an input buffer must be provided, whereas in other situations, the text may be slow in coming and there is a substantial hiatus in the processing needed of processor 15. Neither situation should be allowed to affect the timing correctness of the synthesized output.

To that end, intelligent parser 10 includes a FIFO memory 16 interposed between term detector 11 and "word store" 12, and a FIFO memory 17 interposed between processor 15 and synthesizer 10. FIFO memory 16 operates under control of term detector 11 and processor 15. As soon as a term is detected, it is stored in FIFO 16; and as soon as the processing of the term in "word store" 14 is completed, the oldest term in FIFO 16 is injected into "word store" 12.

FIFO 17 is also under control of processor 15, but it works in a slightly different mode. As soon as a term is modified by processor 15 it is inserted into FIFO 17. Modified terms continue to be inserted until processor 15 determines that a pause in the speech is called for. At that time, all of the terms sorted in FIFO 17 are extracted, in order, and sent to synthesizer 20. In this manner, the completely arbitrary timing of the incoming words is replaced with a timing that comports with the rhythm of natural speech.

The structure of FIG. 1 contemplates different and distinct hardware for carrying out the functions for the intelligent parser-synthesizer of this invention. Such a parser-synthesizer may be placed in each local telephone central office, in some regional office, or associated with a particular type of service (such as the called-party-paying "800 service" or the calling-party-paying "900 service").

Figure 2:
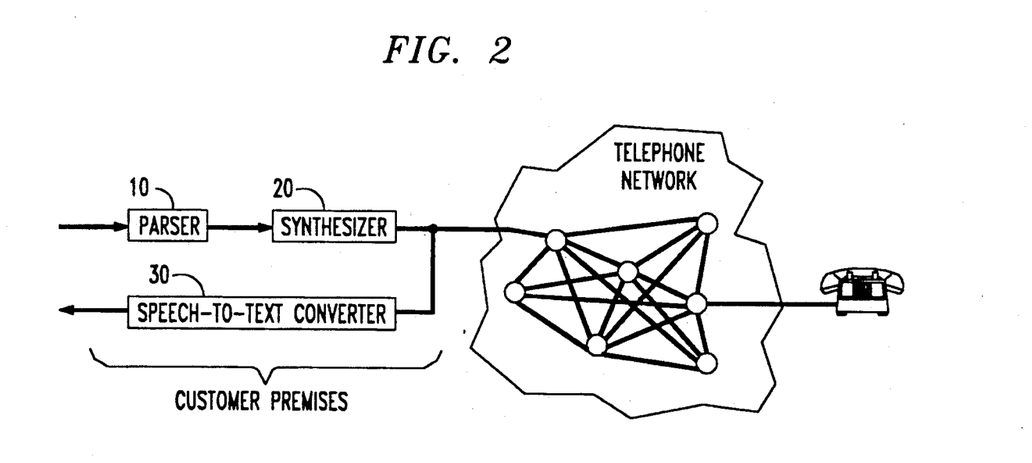
FIG. 2 illustrates the use of the text to speech conversion system in a telephone network, together with a speech to text conversion system.

Such hardware may also be realized in a very compact arrangement that is embodied in one or very few interated circuits. When that realization is carried out, and when the price is low enough, the intelligent parser-synthesizer of FIG. 1 may be included in a customer premises apparatus. FIG. 2 depicts such an arrangement, which includes a subsystem at the customer's premises that is connected to the telephone network. The subsystem of FIG. 2 includes the intelligent parser-synthesizer for the outgoing path, and a speech-to-text converter 30 for the incoming path. Both paths are connected to the telephone network, and through that network the subscriber at the left portion of the drawing is connected to some other subscriber at the right portion of the drawing.

Speech-to-text converters 30 are not as yet robust enough to recognize and detect free flowing speech of arbitrary speakers, but some systems are available that can be trained to recognize up to 5000 words, when trained to a particular speaker. Other systems recognize a more limited vocabulary but from any speaker. Even this modest capability is useful, because the sound-impaired user would not need to enlist the assistance of an attendant at all in some instances, such as when "speaking" by telephone with particular persons (e.g. spouse) when a 5000 word recognition system is used.

Figure 3:
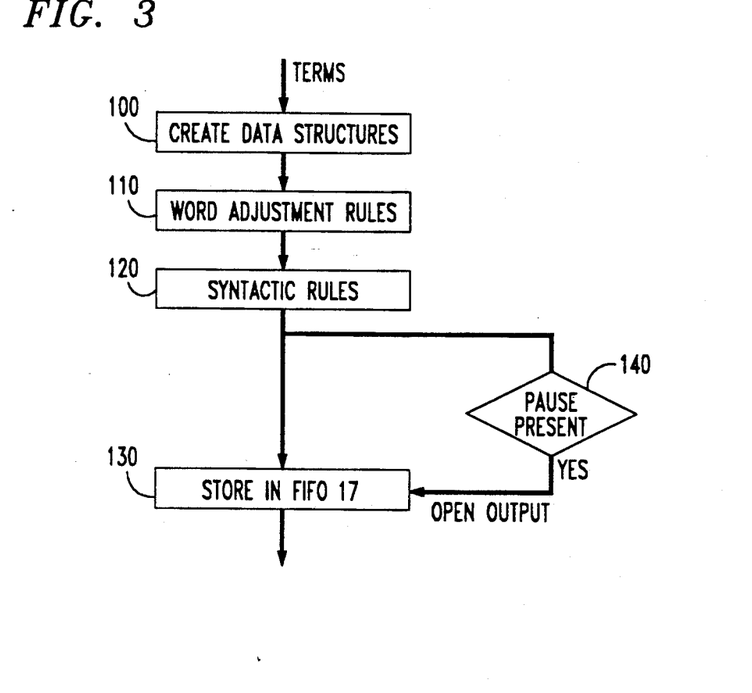
FIG. 3 presents a flow chart for one manner of signal processing in the system of FIG. 1.
Figure 4:
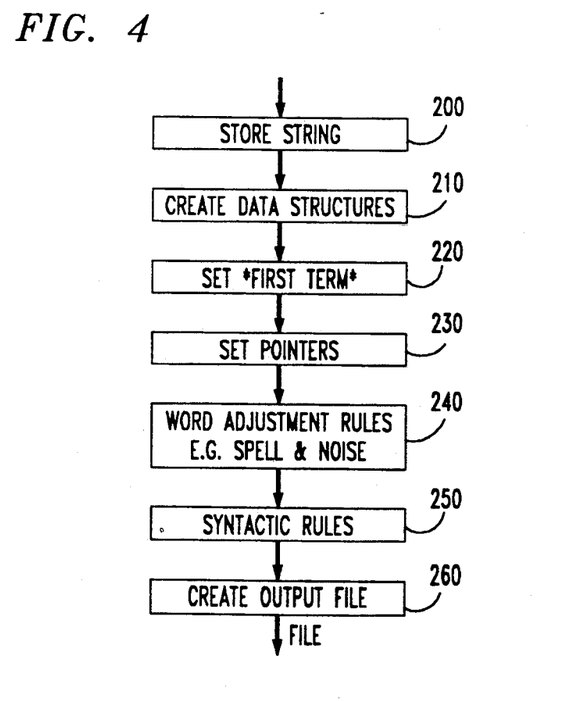
FIG. 4 presents a flow chart for another manner of signal processing in the system of FIG. 1.

There is another aspect to the form of the hardware embodiment that the intelligent parser-synthesizer may take. That is, the FIG. 1 structure may be implemented with a program controlled processor that encompasses all of the elements in FIG. 1, or at least all of the elements within block 10. FIG. 3 presents a flow diagram of the processing performed in a hardware embodiment of FIG. 1, while FIG. 4 presents a flow diagram of the processing performed with a program controlled processor that encompasses all of block 10.

The first block in FIG. 3 (block 100) converts each term that enters "word store" 12 into a data structure. That is, each term is made a part of an associated set of information items, such as the term's spelling, the part of speech to which the term belongs, whether the term is an abbreviation, etc. (Since the terms stored in "word stores" 13 and 14 had previously been in "word store" 12, their data structures are already stored in processor 10 15.)

With the data structures established for the terms in the "word stores", the next step (block 110) is to apply the word adjustment rules. The consequences of the word adjustment rules are stored in the data structures. Next, in block 120, the syntactic rules are applied to determine whether pause flags or a de-emphasis flag should be set. The consequences of this analysis are also stored in the data structures. Finally, in block 130, the processed term of "word store" 14 is stored in FIFO 17.

Block 140 executes the query that leads to an output being provided to the synthesizer. When it is determined that the term stored in FIFO 17 includes a "pause-before" flag, then the FIFO is emptied (the stored information is sent to the synthesizer) and then the term is stored in the FIFO. When a "pause-after" flag is found, then the term is first stored and after the storing action the FIFO is emptied. When neither flag is found, the term is merely stored. In any event, as depicted in FIG. 3, the process continues to block 100 to receive the next term from FIFO 16, as it is loaded into "word store" 12.

FIG. 4 depicts the process by which the intelligent parser of this invention is realized with a program controlled processor. Block 200 stores the input text string into memory and sets a variable *terminal-string* to be the input text string. Block 210 converts each word in *terminal-string* into a "term" data structure with the following fields:

spelling = the spelling of the word, or the printed form of the word, minus any punctuation (? !128). Note that the period (.) is not included as a punctuation because some common TDD words end in a period.
category = if first character of the word is a digit (1 2 3 4 5 6 7 8 9 0), return NUM as category otherwise, the category of the term is the lexical category of the term, which corresponds to the "part of speech" of the known given English or TDD-dialect word. Unknown words are assigned a category of NIL.
special-categories = Some "words" belong to one or more word classes in addition to "parts of speech". This field identifies those special categories (see below).
previous = pointer to previous word in the list that makes up *terminal-string*, if any; else NIL.
next = pointer to next word in the list, if any, else NIL.
pause-before = initially empty (NIL); may later be populated to insert pause by the appropriates character string that is recognized by the synthesizer.
pause-after = initially empty (NIL); may later be populated to insert pause by the appropriates character string that is recognized by the synthesizer.
destress = initially empty (NIL); may later be populated to modify the synthesizer's default speech parameters for this word.
punctuation = contains the punctuation which terminates the word (either;, ! or ?).

The above structure is merely illustrative and other structures can, of course, be employed.

The special categories of a word (third field in the data structure above) may comprise

| | |
|---|---|
| end-of-text markers | go.ahead.1 -- e.g., |
| | go.ahead.2 -- e.g., |
| | stop.keying -- e.g., |
| | q.go.ahead -- e.g., |
| grammatical word classes | interjection.1 -- e.g., |
| | interjection.mod -- e.g., |
| | oneof.and.or.nor -- e.g., |
| | nom.pronouns -- e.g., |
| | subord.1 -- e.g., |
| | subord.2 -- e.g., |
| | subord.mod -- e.g., |
| | destress.pronouns -- e.g., |
| 1-word-abbreviations -- e.g., | |
| two word expressions -- e.g., | |
| three word expressions -- e.g.. | |

Returning to FIG. 4, block 220 sets the variable *first-term* to point to the first term in the list created by block 210. This sets the stage for the beginning point where terms will be delivered to the synthesizer. Thereafter, block 230 sets the pause-before field of the first term (pointed to by *first-term*) to "true".

Block 240 begins the actual processing phase by applying rules for identifying misspellings and noise entries. The processing of block 240 is quite conventional in the sense that in the checking the spelling it may borrow from the approaches taken by any one of the many word processing products that are commercially available, such as "word", "word perfect" etc. These products have mechanisms for determining whether a word is found in a dictionary and, in cases where the word is not found, what correctly spelled words most resemble the misspelled word. A best match procedure can also be employed, as described, for example, in U.S. application titled "A Method for Correcting Spelling using Error Frequencies", filed Jun. 14, 1990. Once the correctly spelled word is identified in a table, the category of the word, as well as its special categories, can be extracted from the same table.

Block 250 continues the word alteration processing. By sliding a 3-word "window" along the list of terms in *terminal-string*, it filters out abbreviations and unorthodox contractions, and attempts to disambiguate the text. That is, it attempts to replace the shortened input text with the proper full-spelling word texts that would be synthesized. Block 250 also performs the converse function of contracting some two word and three word expressions to function as single words; at least for purposes of syntactic analysis. Because these rules may change the number of words in the term list, they often perform splicing of the previous and next list, as well as updating the variable *first-term*. (A few of these rules also refer to the term preceding *first-term*). The following are examples of abbreviations, unorthodox contractions, two word phrases and three word phrases.

| Conventional Abbreviations | Unorthodox Contractions |
|---|---|
| ("min""minute") | (":-)""haha") |
| ("pm""PM") | ("agt""agent") |

-continued

| | |
|---|---|
| ("yrs""years") | ("bcuz""because") |
| ("ans""answer") | ("bec""because") |
| ("asap""assoonaspossible") | ("fone""phone") |
| ("att""AT&T") | ("fwd""forward") |
| ("avg""average") | ("hld""hold") |
| ("bldg""building") | ("nyrc""NewYorkRelayCenter") |
| ("doc""doctor") | ("pblm""problem") |
| ("ext""extension") | ("ph""phone") |
| ("fig""figure") | ("pls""please") |
| ("hrs""hours") | ("qq""?") |
| | ("r""are") |
| | ("wudnt""wouldn't") |
| | ("yur""your") |

| Two Word Expressions | Three Word Expressions |
|---|---|
| (("a""while")"awhile") | (("a""little""while")"alittlewhile") |
| (("believe""so")"believeso") | (("as""far""as")"asfaras") |
| (("byebye")"byebye") | (("as""long""as")"aslongas") |
| (("for""example")"forexample") | (("as""well""as")"aswellas") |
| (("ga""sk")"gask") | (("by""the""way")"bytheway") |
| (("hang""down")"hangdown") | (("ga""or""sk")"gaorsk") |
| (("hope""so")"hopeso") | (("ga""to""sk")"gatosk") |
| (("ily""smile")"Iloveyou,smile") | (("ha""ha""ha")"hahaha") |
| (("instead""of")"insteadof") | (("just""ok""enough") "justokenough") |
| (("it""s")"it's") | (("mother""in""law")"mother-in-law") |
| (("just""ok")"justok") | (("other""than""that")"otherthanthat") |
| (("ok""bye")"okbye") | (("over""n""over")"overandover") |
| (("ok""enough")"okenough") | |
| (("open""up")"openup") | |
| (("opened""up")"openedup") | |
| (("put""off")"putoff") | |
| (("think""so")"thinkso") | |
| (("u""ll")"you'll") | |
| (("u""re")"you're") | |
| (("u""ve")"you've") | |
| (("went""on")"wenton") | |

The rules embodied in block 250 may be customized to the application at hand and modified by the experience gained. The following is one example of such rules, (described in the order applied).

---

Rule 1 - 3-word-expression made up of term1 term2 term3 if (term1-spelling + term2-spelling + term3-spelling is in found in *3-word-expressions* table)
then REPLACE spelling of term3 with canonical spelling
RECOMPUTE the category and special categories for the new spelling.
DELETE term1 and term2 from the list of terms.
UPDATE the list of terms Rule 2 - 2-word-expression term1 term2 if (term1-spelling + term2-spelling + is in found in *3-word-expressions* table)
then REPLACE spelling of term2 with canonical spelling
RECOMPUTE the category and special categories for the new spelling.
DELETE term1 from the list of terms.
UPDATE the list of terms Rule 3 - 1-word-abbreviation term1 if special-categories of term1 is found in abbreviation table
then REPLACE spelling of term1 with canonical spelling
RECOMPUTE the category and special categories for the new spelling Rule 4 - disambiguate term1 term2 term3 (example)

if the category of term1 is "num", and the spelling of term2 is "am"
then REPLACE the spelling of term2 with "AM"

---

Followikng block 250, block 260 continues the processing by introducing phrase rules that add prosodic cues to the speech synthesizer by filling in the pause-before, pause-after, and destress fields of selected terms. The rules that are carried out may be as follows:

Rule 5 - discourse-keys term1 term2 term3

(1) if special-categories of term2 includes interjection—1
then    if special-categories of term1 includes interjection—mod
then    SET pause-before of term1 to "true"
        SET pause-after of term2 to "true"
otherwise SET pause-before of term2 "true"
        SET pause-after term2 to "true"
(2) if special-categories of term2 includes interjection—2
then    if special-categories of term1 includes interjection—mod
then    SET pause-before of term1 to "true"
        SET pause-after of term2 to "true"
(3) if (the previous field of term1 is NULL, and the special-categories of term1 includes either interjection—1 or interjection—2)
then    SET pause-after of term1 to "true"

Rule 6 - conjunction term1 term2 term3 if special-categories of term2 includes oneof—and—or—nor
then    if the spelling of term1 is not identical to the spelling of term3 or the category of term1 is not identical to the category of term3
then    SET pause-after of term1 to "true"

Rule 7 - nominative-pronoun term1 term2 term3

(1) if special-categories of term3 includes nom—pronouns, and special-categories of term2 includes aux—verb.1
then    if the category of term1 is WH
then    SET pause-before of term1 to "true"
otherwise SET pause-before of term2 to "true"
(2) if special-categories of term3 includes nom—pronouns, and (special-categories of term2 includes pre—np—1 or the category of term2 = ADV)
then    if (the category of term1 DOES NOT equal CONJ or PREP, and term1 spelling DOES NOT include "that's", "thats", "it's", "its")
then    SET pause-before of term2 to "true"
(3) if special-categories of term2 includes nom—pronouns
then    if category of term1 DOES NOT equal CONJ or PREP, and special-categories of term1 DOES NOT include (subord—1 or subord—2 or pre—np—1 or aux—verb—1)
then    SET pause-before of term2 to "true"

Rule 8 - there-is term1 term2 term3

(1) if word-spelling of term3 is "there", and

```
special-categories of term2 includes auxverb_1
then      if the category of term1 = WH,
then      SET pause-before of term1 to "true"
(2) if term2 word-spelling is "theres", "there's", "that's", "thats",
or "there" and the special-categories of term3 includes
aux_verb_1
then      if the category of term1 DOES NOT equal CONJ or
          PREP, or special-categories of term1 DOES NOT
          include subord_1, subord_2, or pre_np_1
then      SET pause-before of term2 to "true"
Rule 9 - Subordinating-conj term1 term2 term3
(1) if special-categories of term3 includes subord_1
then      if the term-category of term2 DOES NOT equal
          NUM, and the term-spelling of term3 DOES NOT
          equal "till", "til", or "until"
then      if special-categories of term2 includes subord_mod, OR
          category of term2 equals CONJ
then      SET pause-after of term1 to "true"
otherwise SET pause-after of term2 to "true"
(2) if special-categories of term3 includes subord_2, and
subord_mod, or category of term2 equals CONJ or PREP
then      SET pause-after of term1 to "true"
Rule 10 - final-destressing term1 term2
if special-categories of term1 includes destress_pronouns
then      (1) if pause-before of term2 is "true"
then      SET destress of term1 to "true"
          (2) if pause-after of term1 is "true"
then      SET destress of term1 to "true"
Rule 11 - find-ga term1
(1) if special-categories of term1 includes q_go_ahead
then      (a) REPLACE spelling of term1 to "go ahead."
              SET special-categories of term1 to 0
          (b) if previous of term1 IS NOT null
              SET punctuation of previous of term1 to "?"
(2) if special-categories of term1 includes go_ahead_2
then      REPLACE spelling of term1 to ".go ahead."
          SET special-categories of term1 to 0
(3) if special-categories of term1 includes go_ahead_1
then      REPLACE spelling of term1 to ".go ahead to stop
          keying."
          SET special-categories of term1 to 0
(4) if special-categories of term1 includes stop_keying
then      REPLACE spelling of term1 to ".stop keying."
          SET special-categories of term1 to 0
```

Lastly, block 260 creates an output file for the final pronunciation string. It processes the list of terms from first to last, as follows:

```
if pause-before field = TRUE
then      write a pause control string
          if destress = TRUE
then      write a de-stress control string
          write the contents of the spelling field
if pause-after = TRUE
then      write a pause control string
          write the contents of the punctuation field.
```

I claim:

1. A converter for synthesizing a speech signal comprising:
    a word detector responsive to a freely generated text signal for detecting individual words in said text signal and developing thereby a string of words to be synthesized;
    categorizing means for analyzing each word in the string of words with reference to N neighboring words in the string of words, where N is an integer, to determine the category to which each of the analyzed words belongs; and
    syntax augmenting means responsive to said categorizing means for considering each word in the string and, in the process of considering each word, for inserting a pause generation signal in the string of words, before or after the considered word, when appropriate, based on the category of the considered word.

2. The converter of claim 1 wherein said syntax augmenting means inserts the pause generation signal before or after the considered word, when appropriate, based on the considered word's category and the category of the one of the words immediately adjacent to the considered word.

3. The converter of claim 1 wherein said syntax augmenting means inserts the pause generation signal before or after the considered word, when appropriate, based on the considered word's category and the category of the words immediately adjacent on both sides of the considered word.

4. The converter of claim 1 wherein said syntax augmenting means, additionally, associates a de-emphasis generation signal with each considered word, when appropriate, based on the category of the considered word and on the categories of words immediately adjacent to the considered word.

5. The converter of claim 4, further including a speech synthesizer, responsive to words detected by said word detector, to said pause generation signals and to said de-emphasis signals, for developing a speech signal.

6. The converter of claim 1 wherein said categorizing means includes an N word shift register for passing words through said shift register to form an N word sliding window for analyzing the words in said string of words received by said categorizing means.

7. The converter of claim 1 wherein said categorizing means includes word storage means and word access means for creating an N word window that slides through said string of words to enable analysis of the words received by said categorizing means.

8. The converter of claim 1, further including a speech synthesizer, responsive to the string of words augmented with pause generation signals by said syntax augmenting means, for developing a speech signal.

9. The converter of claim 8, further including an output FIFO memory interposed between said synthesizer and said syntax augmentation means.

10. The converter of claim 8 wherein said output FIFO memory delivers signals to said synthesizer under control of said pause generating signals.

11. The converter of claim 8, having the output signal of said synthesizer connected to a communications network for sending speech signals to said communications network.

12. The converter of claim 11, further comprising a speech-to-text converter connected to said communications network for receiving speech signals and converting received speech signals to text.

13. The converter of claim 1, further including a FIFO memory interposed between said word detector and said categorizing means for storing words detected by said word detector.

14. The converter of claim 13, wherein said FIFO memory stores words under control of said word detector and outputs words under control of said categorizing means.

15. The converter of claim 1, further including an output FIFO memory responsive to said syntax augmentation means.

16. The converter of claim 1 further comprising word modification means within said word categorizing means for recognizing words that are abbreviated forms of full words and for replacing the abbreviated forms with their corresponding full words.

17. The converter of claim 1 further comprising word modification means within said word categorizing means for recognizing and deleting words that are noise words and word portions that are noise portions.

18. The converter of claim 1 further comprising word modification means within said word categorizing means for recognizing the absence of words that are necessary for a chosen degree of intelligibility and injecting the missing words.

19. The converter of claim 1 further comprising word modification means within said word categorizing means for recognizing word phrases and categorizing each word phrase as a single unit.

20. The converter of claim 1 further comprising word modification means within said word categorizing means for recognizing misspelled words and for replacing said misspelled words with their respective correctly spelled words.

21. The converter of claim 1 further comprising word modification means within said word categorizing means for recognizing a predetermined sequence of words and for replacing said sequence of words with another sequence of words.

22. The converter of claim 1 further comprising word modification means within said word categorizing means for recognizing a word in said string of words as being in improper form and replacing the word having said improper form with a corresponding word having the proper form.

23. The converter of claim 1 further comprising word modification means within said word categorizing means for recognizing the detected individual word as a combination of words and for separating said words from the combination to result in a multiple-word phrase.

24. The converter of claim 1 further comprising word modification means within said word categorizing means for modifying a sequence of words in accordance with a set of syntactic rules customized for a particular set of users.

25. The converter of claim 1 further comprising word modification means within said word categorizing means for modifying a sequence of words in accordance with a set of standard English syntactic rules.

26. A converter for synthesizing a speech signal comprising:

a word detector responsive to a freely generated text signal for detecting individual words in said text signal and developing thereby a string of words to be synthesized, said string of words forming a set;

word modification means for transforming, in accordance with pre-established rules, said set formed by the detected string of words into a different set having another string of words;

categorizing means, responsive to the other string of words from said different set, for analyzing each word in said other string of words with reference to N neighboring words in said other string of words, where N is an integer, and for determining thereby the categories to which each of the analyzed words belongs, syntax augmenting means responsive to said categorizing means for identifying pause-accepting words in said other string of words based on said categories and for inserting pause generation signals, in association with the identified words, into said other string of words to be synthesized.

27. The invention of claim 26 wherein said word modifying means recognizes words in said string of words that are noise words and deletes the noise words from said set to form said other string of words in said different set.

* * * * *

UNITED STATES PATENT AND TRADEMARK OFFICE
CERTIFICATE OF CORRECTION

| | |
|---|---|
| PATENT NO. | : 5,157,759 |
| APPLICATION NO. | : 07/546127 |
| DATED | : October 20, 1992 |
| INVENTOR(S) | : Joan C. Bachenko |

It is certified that error appears in the above-identified patent and that said Letters Patent is hereby corrected as shown below:

Column 9

Line 61, after the term "where N is in integer," insert -- contemporaneously with the availability of words and their N neighboring words from the word detector, --.

Column 11

Line 21 Claim 20, after the term "spelled words", insert -- prior to assigning a category --.

Column 11

Line 26 Claim 21, after the term "another sequence of words", insert -- prior to assigning a category --.

Column 11

Line 32 Claim 22, after the term "the proper form", insert -- prior to assigning a category --.

Column 11

Line 38 Claim 23, after the term "phrase", insert -- prior to assigning a category --.

Column 12

Line 5 Claim 24, after the term "set of users", insert -- prior to assigning a category, forming thereby a new sequence of words having substantially the same meaning as the sequence of words that is modified --.

Column 12

Line 9 Claim 25, after the term "with a set of standard English syntactic rules", insert -- prior to assigning a category, forming thereby a new sequence of words having substantially the same meaning as the sequence of words that is modified --.

UNITED STATES PATENT AND TRADEMARK OFFICE
CERTIFICATE OF CORRECTION

PATENT NO. : 5,157,759
APPLICATION NO. : 07/546127
DATED : October 20, 1992
INVENTOR(S) : Joan C. Bachenko

It is certified that error appears in the above-identified patent and that said Letters Patent is hereby corrected as shown below:

Column 12

Line 24 Claim 26, after the term "where N is an integer," insert -- contemporaneously with the availability of words and their N neighboring words from the word detector, --.

Signed and Sealed this

Twentieth Day of January, 2009

JON W. DUDAS
*Director of the United States Patent and Trademark Office*